(12) United States Patent
Hamberger et al.

(10) Patent No.: US 6,647,338 B1
(45) Date of Patent: Nov. 11, 2003

(54) NAVIGATION DEVICE

(75) Inventors: Klaus Hamberger, Lenting (DE); Wolfram Remlinger, Ingolstadt (DE); Jurgen Schroder, Wettstetten (DE)

(73) Assignee: Audi AG (DE)

( * ) Notice: Subject to any disclaimer, the term of this patent is extended or adjusted under 35 U.S.C. 154(b) by 0 days.

(21) Appl. No.: 10/070,064

(22) PCT Filed: Sep. 6, 2000

(86) PCT No.: PCT/EP00/08675

§ 371 (c)(1),
(2), (4) Date: Feb. 27, 2002

(87) PCT Pub. No.: WO01/20579

PCT Pub. Date: Mar. 22, 2001

(30) Foreign Application Priority Data

Sep. 15, 1999 (DE) .......................... 199 44 080
Sep. 15, 1999 (DE) .......................... 199 44 081

(51) Int. Cl.$^7$ .............................................. G01C 21/00
(52) U.S. Cl. ...................... 701/212; 345/184; 345/649; 345/659

(58) Field of Search ................. 701/212, 200; 340/988, 995, 990; 345/161, 184, 649, 659, 156, 428

(56) References Cited

U.S. PATENT DOCUMENTS

| 4,504,913 A | | 3/1985 | Miura ........................ 701/212 |
| 4,608,656 A | | 8/1986 | Tanaka ....................... 701/212 |
| 4,935,728 A | | 6/1990 | Kley .......................... 345/161 |
| 5,555,172 A | * | 9/1996 | Potter ......................... 455/456 |
| 6,404,420 B1 | * | 6/2002 | Klein et al. ................. 345/184 |

* cited by examiner

*Primary Examiner*—Marthe Y. Marc-Coleman
(74) *Attorney, Agent, or Firm*—Stevens, Davis, Miller & Mosher, LLP

(57) ABSTRACT

A navigation device for installation in a motor vehicle. The navigation device has a monitor on which a plurality of images, including a map image and a menu, and a rotary switch. The scale of the display as well as other features can be selected or changed by combinations or rotations and depressions of the rotary switch.

19 Claims, 1 Drawing Sheet

NAVIGATION DEVICE

The invention relates to a navigation device, in particular one for installation in a motor vehicle, as specified in the preamble of patent claim 1.

BACKGROUND OF THE INVENTION

Generic navigation devices with a monitor on which a map may be displayed, especially ones for use in motor vehicles, are widely known. Known from the state of the art are navigation devices in which the scale of a map displayed on a monitor may be modified by operation of push switches. In one of these navigation devices the push switches are in the form of plus and minus keys, so that the display scale can be enlarged or decreased by pressing the appropriate key. So that the user does not lose the proper perspective, the change in scale per key depression stroke is kept small. This, however, results in complicated and sometimes time consuming operation, since the speed with which the scale may be changed by repeated depression of one of the keys is limited. This is undesirable, since the time during which the driver must take one hand off the steering wheel must be minimal.

In another navigation device known from the state of the art a scale may be displayed by a submenu on the monitor; a bar moves on the scale and thus a specific scale can be selected. After confirmation by the user, the map is displayed on the monitor on the scale selected. A navigation device such as this presupposes, however, that before choosing the user will consider his options in order to determine the scale which for him corresponds to the optimum display of the map. A user who has previously acquired little experience with this device, will thus not be able to select the scale corresponding to the display desired. Should the user wish to change scales frequently, this device also seems to be very complicated and not very user-friendly.

SUMMARY OF INVENTION

In this context the object of the invention is further development of a generic navigation device in such a way that the scale of an image, especially that of a map, may be changed by simple means and as quickly as possible even by an inexperienced user, in the manner desired and with high user friendliness.

This object is attained by a navigation device as specified for the characteristics set forth in patent claim 1. The dependent claims relate to especially advantageous developments of the invention.

It is claimed for the invention that a navigation device is provided in which the change of scale is effected by rotating a rotary switch, one which may be rotated at a speed determined by the user himself. The time required for the change of scale consequently depends only the speed with which the image may be displayed on the monitor on the new scale. In addition, even an inexperienced user can by direct observation of the change of display during rotation of the rotary switch easily find the display scale he desires. The navigation device may thus be characterized as very comfortable and extremely simple to operate. It also presents the advantage that only one operating element is provided and must be found and grasped by the user in order to effect a change of scale.

One advantageous further development of the invention provides that the center of the image is retained during selection of the scale, since the user will instinctively select the visible window on the monitor so that the area of the image of interest to him will be situated almost in the center.

In another operating mode the direction of movement of a cursor on the image may be selected by rotating the rotary switch. While the rotary switch may still be used for other operational functions of the navigation device, for example, in other axial positions, the operating comfort of the navigation device is further increased. Change in the possible direction of movement of the cursor by rotating the rotary switch is especially user-friendly, since the movement to be executed by the user is similar to that of the rotation to be observed on the monitor of the cursor, which is shown as an arrow, for example. In this way adjustment of the direction of movement of the cursor may be extremely flexible, and the user is not limited, as in other devices, to movement in only four or eight different directions, for example, right, left, up and down.

In one further development of the invention, operation of the rotary switch, for example, rotation of the rotary switch or application of axial force to this switch, in another operating mode movement of a cursor may be executed in a selected direction or in the opposite direction or may be canceled, as a result of which operation of the navigation device is further simplified, since the user also does not have to reposition his hand or fingers to move the cursor. If the rotary switch has a plurality of operating modes, this function is preferably linked to the extreme positions of the rotary switch, that is, fully depressed or entirely free of pressure. Initiation or execution of a cursor movement may be carried out before or after setting a direction of movement for the cursor. In the event of initiation of a movement before setting of a direction of movement, preferably the direction of movement most recently set or movement along a previously assigned route or in the direction of a previously entered goal is to be taken as the default direction. The initial direction of the cursor may then be changed during movement of the cursor by rotation of the rotary switch in the direction desired.

If movement of the cursor is initiated by application of axial force to the rotary switch, for a predetermined period of time, for example, the advantage is obtained that, especially during prolonged movement of the cursor in one direction, there is no need for repeated movement of hand or fingers in one direction, but rather the hand or fingers may remain in the same position on the rotary switch during cursor movement.

Provision may also be made such that in another operating mode one function may be selected by rotating the rotary switch. An embodiment such as this renders addition of numerous function keys superfluous and the operating unit of the navigation device claimed for the invention continues to be clearly displayed. The operating mode and/or at least one of the additional operating modes may be selected by means of the function. The operating mode could consequently be selected also by rotating the rotary switch, so that all the operating steps required for use of the navigation device can be carried out with the rotary switch.

Another embodiment of the invention provides that the operating mode and/or at least one of the additional operating modes can be set by actuating at least one of the additional rotary, pressure, and/or slider switches. This embodiment is highly advantageous when the operating mode must be changed very frequently.

In an advantageous development of the invention the operating mode and/or at least one of the additional operating modes may be set by application of axial force over a predetermined period to the rotary switch, preferably against the force of a spring. This development is especially easy to operate if only a few operating modes are used.

BRIEF DESCRIPTION OF THE DRAWINGS

One embodiment of the invention is described in what follows with reference to accompanying drawings, FIG. 1 showing a top view of a schematic representation of a rotary switch of the navigation device claimed for the invention;

DETAILED DESCRIPTION OF THE INVENTION

Figure 1:
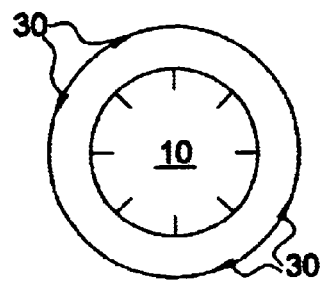
Figure 2:
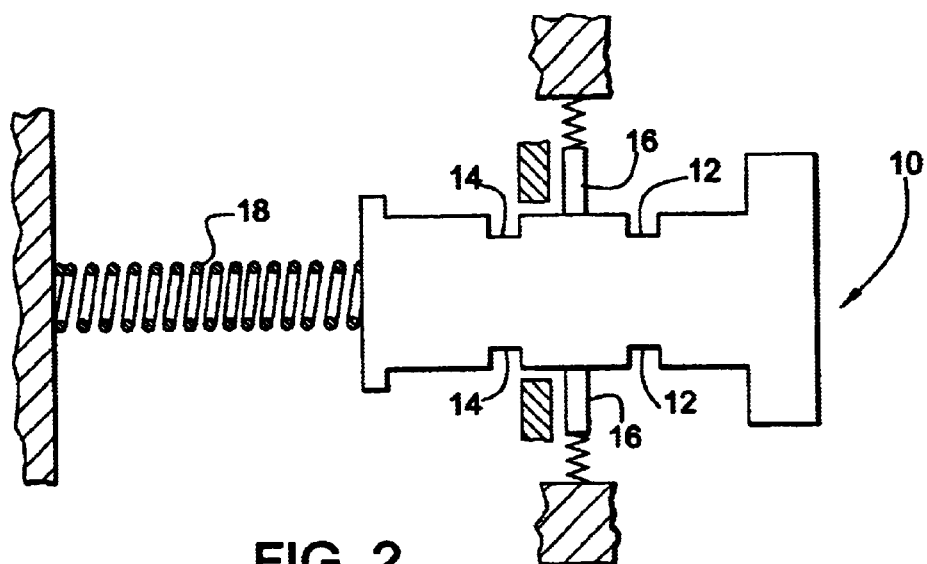
FIG. 2 a schematic representation in a side view of a rotary switch as illustrated in FIG. 1.

A rotary switch 10 shown in FIGS. 1 and 2 is mounted in a vehicle in a location ergonomically favorable to the user. In addition to operation of the navigation device, this rotary switch 10 is used for other purposes as well, that is, for operation of other devices in the motor vehicle, for example, to operate a car phone, a CD player, and the like. As is indicated by the arrows 30, this rotary switch 10 may be rotated clockwise and counterclockwise, and in addition may be shifted to other positions by axial movement, the user experiencing a haptic response during transition between individual positions. The rotary switch 10 has a first recess 12 and a second recess 14 in which catching elements 16 may catch, so that the rotary switch may be immobilized in two different axial positions. A movement from the equilibrium position shown in FIG. 2 is made against the force of a spring 18.

Figure 3:
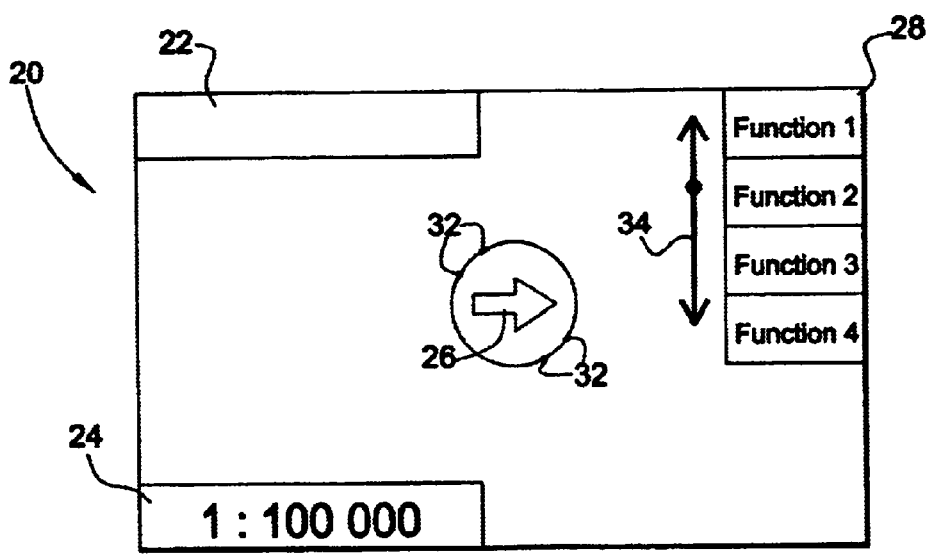
FIG. 3 a schematic representation of a monitor of the navigation device claimed for the invention.

The navigation device also has a monitor 20, shown in the form of a diagram in FIG. 3 and mounted in a motor vehicle in such a way that the device is clearly visible to the user.

The individual axial positions are correlated with various operating modes; these modes and their setting are described in what follows with reference to FIGS. 2 and 3.

A first axial position is to be set by pressing the rotary switch 10 to a noticeable stop, the catching elements 16 catching in the first recess 12. The operating mode "change of scale" is displayed on the monitor 20 in a first display field 22. In addition, a display symbol reproducing a current scale of a map presented is displayed in a second display field 24 on the monitor. The scale of the map may now be varied by rotating the rotary switch 10, the map on the current scale being displayed simultaneously on the monitor 20. If the rotary movement of the rotary switch 10 is set, the current scale of reproduction is stored and remains until a subsequent change in scale takes place.

A second axial position may be reached from the first axial position by exertion of slight pressure on the rotary switch 10 against the force of a spring 18. The rotary switch 10 is not locked in this position; this position is rather retained for a predetermined period of time, and as a result a different operating mode may be selected. The "cursor movement-arrow direction" thereby selected is displayed in the first display field 22 on the monitor 20. Also to be seen on the monitor now is a cursor 26, which begins to move in a default direction. The speed of cursor movement may be appropriately correlated with the scale of map reproduction. Change in the direction of movement of the cursor 26, as indicated by arrows 32, can be effected by rotating the rotary switch 10. In the process the cursor 26 may be displayed as an arrow on the monitor 20 in order to indicate its direction of movement. The "cursor movement-arrow direction" operating mode may be left again as a result of repeated pressing of the rotary switch 10 into the second axial position for a predetermined time.

A third axial position can be reached from the first axial position by pulling gently on the rotary switch 10. The catching elements 16 then catch perceptibly to the user in the second recess 14 of the rotary switch 10. A previously selected route is optically emphasized on the map, and in addition the current "cursor movement-route" is displayed in the first display field 22 on the monitor 20. The cursor 26 may be moved over the preselected route by rotation of the rotary switch 10.

The fourth axial position is reached from the third axial position by pulling on the rotary switch 10. If this position, in which the rotary switch 10 does not catch, is occupied for a predetermined period, an additional operating mode may be selected. In this operating mode functions which are now displayed in a third display field 28 on the monitor may be selected by rotating the rotary switch 10. This is illustrated by the arrow 34. The particular function selected is optically emphasized on the monitor 20 and by exertion of pressure briefly on the rotary switch 10 or by pulling the rotary switch 10 the function selected is called up. The functions are displayed on the monitor 20 in such a way that viewing of the map is not needlessly impeded. In one embodiment of the invention the functions are arranged in a circle on the monitor 20.

One of the selectable functions is so-called local information whereby information concerning a place or its immediate vicinity may be called up. One other function is determination of a point on the map selected with the cursor 26 as an intermediate destination or [final] destination. By means of a distance display function the distance between the current position of the vehicle and a selected point on the map is indicated by the cursor 26.

In an alternative embodiment of the invention the cursor 26 is stationary in the center of the image displayed on the monitor 20, and in the "cursor movement-direction of arrow" and "cursor movement-route" operating mode, the map is moved either in the direction of the arrow of the cursor 26 or is displaced so that the center of the image is guided along the predetermined route.

In another alternative embodiment the direction of cursor movement may be set when the cursor 26 is at rest. After the direction has been set, the rotary switch 10 may then actuated to initiate movement of the cursor 26 in this direction; this direction may be changed by rotating the rotary switch 10.

In another alternative embodiment operating modes may be changed, for example, by means of a rotary switch 10 mounted so as to be subjected to the pressure exerted by a spring 28; the various operating modes are run in cycles and brief pressure applied to the rotary switch 10 once is correlated with a first operating mode, application of pressure briefly twice in succession with a second operating mode, and so forth.

What is claimed is:

1. A navigation device, for a motor vehicle, comprising:
    a monitor on which at least one image may be displayed, including an image of a map; and
    a rotary switch,
    wherein in a first operating mode, a scale of the map image is selected by rotation of the rotary switch and in a second operating mode, a cursor is moved along a predetermined route in the at least one image by one of application of an axial force to the rotary switch and rotation of the rotary switch.

2. The navigation device as specified in claim 1, wherein the a center of the map image is retained when the scale is selected.

3. The navigation device as specified in claim 1, wherein the a direction of movement of a the cursor in the at least one image is selected by rotation of the rotary switch.

4. The navigation device as specified in claim 1, wherein movement of a the cursor in a selected direction of movement or in a direction opposite the selected direction is effected through rotation of the rotary switch.

5. The navigation device as specified in claim 4, wherein the selected direction of movement of the cursor during movement of the cursor or with the cursor at rest is changed through rotation of the rotary switch.

6. The navigation device as specified in claim 1, wherein movement of a the cursor in a selected direction or in t a direction opposite the selected direction is effected or canceled through an application of an axial force on the rotary switch.

7. The navigation device as specified in claim 6, wherein the selected direction of movement of the cursor during movement of the cursor or with the cursor at rest is changed through rotation of the rotary switch.

8. The navigation device as specified in claim 1, wherein an image may be called up which is a menu containing at least one function.

9. The navigation device as specified in claim 8, wherein each of the first operating mode, the second operating mode and at least one additional operating mode is set by means of the function.

10. The navigation device as specified in claim 1, wherein a function may be selected in another operating mode through rotation of the rotary switch.

11. The navigation device as specified in claim 1, wherein each of the first operating mode, the second operating mode and at least one additional operating mode is set through axial movement of the rotary switch.

12. The navigation device as specified in claim 1, wherein the each of the first operating mode, the second operating mode and a at least one additional operating mode is set through operation of at least one additional rotary switch, a pressure switch, or a sliding switch.

13. The navigation device as specified in claim 1, wherein each of the first operating mode, the second operating mode and at least one additional operating mode is set through a brief application of axial force to the rotary switch.

14. A navigation device for a motor vehicle, comprising:

a monitor on which at least one image is displayed, including an image of a map and image of a menu; and a rotary switch, wherein in one operating mode, a scale of the map image is selected by rotation of the rotary switch, and wherein a point on the map image or a reigion in a vicinity of the point corresponding to a current cursor position is identified by an information function.

15. The navigation device as specified in claim 14, wherein the point on the map corresponding to the current cursor position is selected as a destination or an intermediate destination by information the function.

16. The navigation device as specified in claim 15, wherein a distance between the destination or the intermediate destination and a current position of the vehicle is displayed on the monitor by the information function.

17. A navigation device for a motor vehicle comprising:

a monitor on which at least one image is displayed, including an image of a map and an image of a menu; and a rotary switch.

wherein in one operating mode a scale of the map image is selected by rotation of the rotary switch, and wherein a point on the map corresponding to a current cursor position is selected as a destination or an intermediate destination by an information function.

18. The navigation device as specified in claim 17, wherein a distance between the destination or the intermediate destination and a current position of the vehicle is displayed on the monitor by the information function.

19. A navigation device for a motor vehicle, comprising:

a monitor on which at least one image is displayed including an image of a map; and a rotary switch, wherein in a first operating mode a scale of the map image is selected by rotation of the rotary switch, and in a second operating mode, a function may be selected by rotation of the rotary switch, and wherein a point on the map image or a region in a vicinity of the point corresponding to a current cursor position is identified by an information function.

* * * * *